US011816855B2

(12) United States Patent
Luo et al.

(10) Patent No.: US 11,816,855 B2
(45) Date of Patent: Nov. 14, 2023

(54) ARRAY-BASED DEPTH ESTIMATION

(71) Applicant: Samsung Electronics Co., Ltd., Suwon-si (KR)

(72) Inventors: Chenchi Luo, Plano, TX (US); Yingmao Li, Allen, TX (US); Kaimo Lin, Richardson, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 17/027,106

(22) Filed: Sep. 21, 2020

(65) Prior Publication Data

US 2021/0248769 A1  Aug. 12, 2021

Related U.S. Application Data

(60) Provisional application No. 63/056,999, filed on Jul. 27, 2020, provisional application No. 62/972,689, filed on Feb. 11, 2020.

(51) Int. Cl.
  *G06T 7/593* (2017.01)
  *H04N 13/271* (2018.01)
  (Continued)

(52) U.S. Cl.
  CPC ............ *G06T 7/593* (2017.01); *H04N 13/128* (2018.05); *H04N 13/271* (2018.05); *G06T 2207/10028* (2013.01); *H04N 2013/0081* (2013.01)

(58) Field of Classification Search
  CPC ........... G06T 7/593; G06T 2207/10028; G06T 7/596; H04N 13/128; H04N 13/271; H04N 2013/0081; H04N 23/90; G01B 11/245

(Continued)

(56) References Cited

U.S. PATENT DOCUMENTS 5,917,937 A * 6/1999 Szeliski ................. G06T 7/593
                                                    348/E13.059
11,393,114 B1 * 7/2022 Ebrahimi Afrouzi ........................
                                                    G01C 21/3848

(Continued)

FOREIGN PATENT DOCUMENTS

KR    10-2016-0083905 A    7/2016

OTHER PUBLICATIONS

O. Moslah et al., "Accelerated multi-view stereo using parallel processing capababilities of the GPUS," 2009 3DTV Conference: The True Vision—Capture, Transmission and Display of 3D Video, Potsdam, Germany, 2009, pp. 1-4, doi: 10.1109/3DTV.2009 (Year: 2009).*

(Continued)

*Primary Examiner* — Kathleen Y Dulaney

(57) ABSTRACT

A method includes obtaining at least three input image frames of a scene captured using at least three imaging sensors. The input image frames include a reference image frame and multiple non-reference image frames. The method also includes generating multiple disparity maps using the input image frames. Each disparity map is associated with the reference image frame and a different non-reference image frame. The method further includes generating multiple confidence maps using the input image frames. Each confidence map identifies weights associated with one of the disparity maps. In addition, the method includes generating a depth map of the scene using the disparity maps and the confidence maps. The imaging sensors are arranged to define multiple baseline directions, where each baseline direction extends between the imaging sensor used to capture the reference image frame and the imaging sensor used to capture a different non-reference image frame.

21 Claims, 9 Drawing Sheets

(51) Int. Cl.
*H04N 13/128* (2018.01)
*H04N 13/00* (2018.01)

(58) Field of Classification Search
USPC .......................................... 382/154, 106, 156
See application file for complete search history.

(56) References Cited

U.S. PATENT DOCUMENTS

| | | | |
|---|---|---|---|
| 2012/0039525 A1* | 2/2012 | Tian | H04N 13/246 382/154 |
| 2012/0257815 A1* | 10/2012 | Schlosser | H04N 13/133 382/154 |
| 2012/0321172 A1* | 12/2012 | Jachalsky | G06T 7/593 382/154 |
| 2013/0129194 A1* | 5/2013 | Gusis | G06T 5/50 382/154 |
| 2014/0321712 A1* | 10/2014 | Ciurea | G06T 7/593 382/106 |
| 2014/0340404 A1* | 11/2014 | Wang | H04N 13/279 345/427 |
| 2015/0022640 A1* | 1/2015 | Metzler | H04N 13/221 348/46 |
| 2015/0071524 A1 | 3/2015 | Lee | |
| 2016/0301910 A1 | 10/2016 | Lucas | |
| 2017/0067739 A1* | 3/2017 | Siercks | G01C 15/006 |
| 2017/0251143 A1* | 8/2017 | Peruch | H04N 13/239 |
| 2018/0255283 A1* | 9/2018 | Li | H04N 13/271 |
| 2018/0309974 A1* | 10/2018 | Varekamp | H04N 13/106 |
| 2019/0182475 A1* | 6/2019 | Wu | H04N 13/25 |
| 2020/0160548 A1* | 5/2020 | Yun | G06T 7/596 |
| 2021/0209777 A1* | 7/2021 | Zhao | H04N 21/21805 |
| 2022/0206156 A1* | 6/2022 | Yoshimura | G06T 7/521 |

OTHER PUBLICATIONS

International Search Report and Written Opinion of the International Searching Authority dated Aug. 5, 2021 in connection with International Patent Application No. PCT/KR2021/095070, 10 pages.

Mayer et al., "A Large Dataset to Train Convolutional Networks for Disparity, Optical Flow, and Scene Flow Estimation," 2016 IEEE Conference on Computer Vision and Pattern Recognition (CVPR), Jun. 2016, 14 pages.

Godard et al., "Unsupervised Monocular Depth Estimation with Left-Right Consistency," 2017 IEEE Conference on Computer Vision and Pattern Recognition (CVPR), Jul. 2017, 14 pages.

Smolyanskiy et al., "On the Importance of Stereo for Accurate Depth Estimation: An Efficient Semi-Supervised Deep Neural Network Approach," 2018 IEEE/CVF Conference on Computer Vision and Pattern Recognition Workshops (CVPRW), Jun. 2018, 9 pages.

Saikia et al., "DispNet-CSS: Robust Vision Submission," ROB2018 submission, Jun. 2018, 4 pages.

Hamid et al., "Stereo Matching Algorithm based on Deep Learning: A Survey," Journal of King Saud University—Computer and Information Sciences, revised and accepted Aug. 2020, 32 pages.

Zhang et al., "End-to-End Learning of Multi-scale Convolutional Neural Network for Stereo Matching," Proceedings of Machine Learning Research, 2018, 16 pages.

* cited by examiner

ARRAY-BASED DEPTH ESTIMATION

CROSS-REFERENCE TO RELATED APPLICATIONS AND PRIORITY CLAIM

This application claims priority under 35 U.S.C. § 119(e) to U.S. Provisional Patent Application No. 63/056,999 filed on Jul. 27, 2020, which is hereby incorporated by reference in its entirety. This application also claims priority under 35 U.S.C. § 119(e) to U.S. Provisional Patent Application No. 62/972,689 filed on Feb. 11, 2020.

TECHNICAL FIELD

This disclosure relates generally to imaging systems. More specifically, this disclosure relates to array-based depth estimation.

BACKGROUND

Many mobile electronic devices, such as smartphones and tablet computers, include cameras that can be used to capture still and video images. In many mobile electronic devices today, multiple cameras can be used to simultaneously capture multiple images of scenes, such as when left and right cameras of an electronic device are used to simultaneously capture two images of a scene. The ability to simultaneously capture multiple images of a scene allows an electronic device to perform disparity processing in order to identify depths of different image pixels within the scene. Disparity refers to the difference in pixel locations of the same point in a scene as captured in different images of the scene. Depth has a known relationship to disparity. A point within a scene that is farther away (has a larger depth) will typically have a smaller disparity, meaning pixels capturing that point in different images will be closer to each other in the images. A point within a scene that is closer (has a smaller depth) will typically have a larger disparity, meaning pixels capturing that point in different images will be farther apart from each other in the images.

SUMMARY

This disclosure relates to array-based depth estimation.

In a first embodiment, a method includes obtaining, using one or more processors, at least three input image frames of a scene captured using at least three imaging sensors. The input image frames include a reference image frame and multiple non-reference image frames. The method also includes generating, using the one or more processors, multiple disparity maps using the input image frames. Each disparity map is associated with the reference image frame and a different one of the non-reference image frames. The method further includes generating, using the one or more processors, multiple confidence maps using the input image frames. Each confidence map identifies weights associated with one of the disparity maps. In addition, the method includes generating, using the one or more processors, a depth map of the scene using the disparity maps and the confidence maps. The imaging sensors are arranged to define multiple baseline directions, where each baseline direction extends between the imaging sensor used to capture the reference image frame and the imaging sensor used to capture a different one of the non-reference image frames.

In a second embodiment, an apparatus includes at least three imaging sensors and at least one processor. The at least one processor is configured to obtain at least three input image frames of a scene using the at least three imaging sensors. The input image frames include a reference image frame and multiple non-reference image frames. The at least one processor is also configured to generate multiple disparity maps using the input image frames. Each disparity map is associated with the reference image frame and a different one of the non-reference image frames. The at least one processor is further configured to generate multiple confidence maps using the input image frames. Each confidence map identifies weights associated with one of the disparity maps. In addition, the at least one processor is configured to generate a depth map of the scene using the disparity maps and the confidence maps. The imaging sensors are arranged to define multiple baseline directions. Each baseline direction extends between the imaging sensor used to capture the reference image frame and the imaging sensor used to capture a different one of the non-reference image frames.

In a third embodiment, a non-transitory computer readable medium contains instructions that when executed cause at least one processor to obtain at least three input image frames of a scene captured using at least three imaging sensors. The input image frames include a reference image frame and multiple non-reference image frames. The medium also contains instructions that when executed cause the at least one processor to generate multiple disparity maps using the input image frames. Each disparity map is associated with the reference image frame and a different one of the non-reference image frames. The medium further contains instructions that when executed cause the at least one processor to generate multiple confidence maps using the input image frames. Each confidence map identifies weights associated with one of the disparity maps. In addition, the medium contains instructions that when executed cause the at least one processor to generate a depth map of the scene using the disparity maps and the confidence maps. The input image frames are associated with multiple baseline directions. Each baseline direction extends between the imaging sensor used to capture the reference image frame and the imaging sensor used to capture a different one of the non-reference image frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
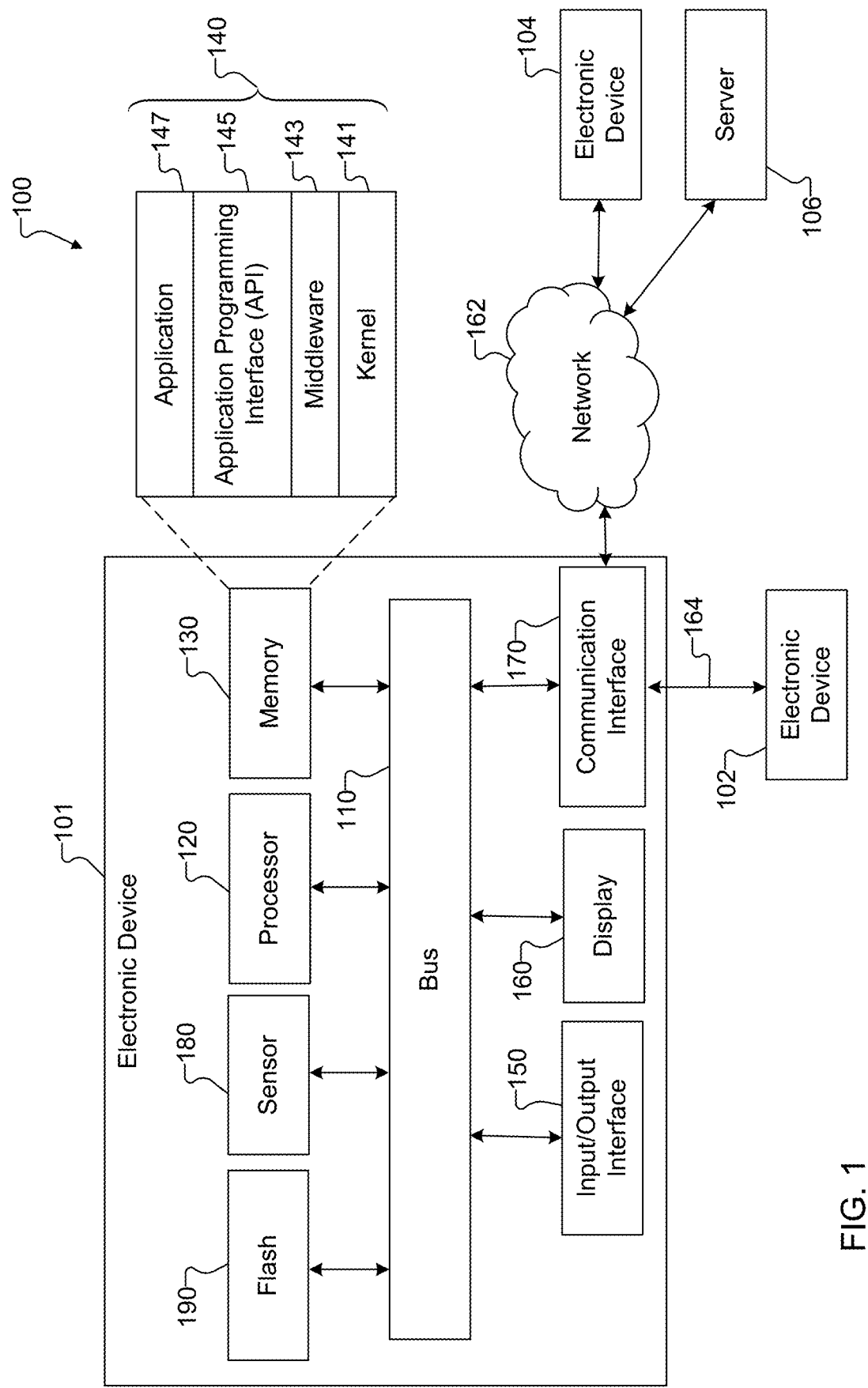
FIG. 1 illustrates an example network configuration including an electronic device in accordance with this disclosure.

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include multiple cameras that can be used to simultaneously capture multiple images of scenes. The ability to simultaneously capture multiple images of a scene allows an electronic device to perform disparity processing in order to identify depths of different image pixels within the scene. Disparity refers to the difference in pixel locations of the same point in a scene as captured in different images of the scene. Depth has a known relationship to disparity. A point within a scene that is farther away (has a larger depth) will typically have a smaller disparity, meaning pixels capturing that point in different images will be closer to each other in the images. A point within a scene that is closer (has a smaller depth) will typically have a larger disparity, meaning pixels capturing that point in different images will be farther apart from each other in the images.

By identifying disparities between pixels in multiple images of a scene, an electronic device can generate a depth map that identify the depths of the pixels within the scene. The depth map may be used to support various image processing operations or other operations. Unfortunately, it can be difficult for an electronic device to accurately estimate disparity or depth of certain types of objects or backgrounds in some scenes, such as objects or backgrounds that have repetitive patterns or feature-less (substantially uniform) patterns. This can be fairly common in images of natural scenes, images of scenes with manmade features, or images of other scenes. For a feature-less pattern, the electronic device may be unable to distinguish between different points of the feature-less pattern. For a repetitive pattern, the electronic device may be unable to distinguish between different portions of the same repetitive pattern. As a result, because the electronic device cannot accurately estimate disparity or depth, various other functions that rely on accurate disparity or depth estimations may not produce accurate results.

This disclosure provides techniques for array-based depth estimation. As described in more detail below, multiple input image frames of a scene are captured using at least three imaging sensors of an electronic device. The imaging sensors are arranged in a non-linear manner so that the image frames captured using the imaging sensors are displaced along multiple baseline directions (such as horizontally and vertically). As a result, the input image frames have disparities in multiple directions. A machine learning algorithm is applied to the image frames in order to generate multiple disparity maps and multiple confidence maps associated with the disparity maps. Each disparity map is produced using a different pair of the image frames, and each disparity map is associated with a specific baseline direction that identifies an axis along which the two imaging sensors that captured the pair of the image frames are separated. Each confidence map identifies the level of confidence that the machine learning algorithm has in the disparities identified in one of the disparity maps along the associated baseline direction. The disparity maps and the confidence maps can be fused to produce a final depth map of the scene based on the input image frames.

In this way, it is possible to use image frames captured using three or more cameras or other imaging sensors to significantly increase the accuracy of a final depth map for a scene. Among other reasons, this is because disparities along multiple baseline directions are calculated and used, along with their confidence levels, to generate the final depth map. This also enables various image processing operations to obtain more aesthetically-pleasing or accurate results based on the generated depth maps. For instance, the generation of high-accuracy depth maps can be used in various image processing applications, such as bokeh image generation, depth-aware deblurring, image relighting, augmented reality (AR), mixed reality (MR), visual simultaneous localization and mapping (SLAM), odometry, and animoji-related processes.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain input image frames and generate high-accuracy depth maps based on the input image frames. The processor 120 may also perform one or more image processing operations or other operations based on the generated depth maps.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain input image frames and generate high-accuracy depth maps based on the input image frames. The application 147 may also include one or more applications that perform one or more image processing operations or other operations based on the generated depth maps. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include multiple cameras or other imaging sensors, which may be used to capture image frames of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may execute one or more applications that, among other things, obtain input image frames and generate high-accuracy depth maps based on the input image frames. The server 106 may also execute one or more applications that perform one or more image processing operations or other operations based on the generated depth maps.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
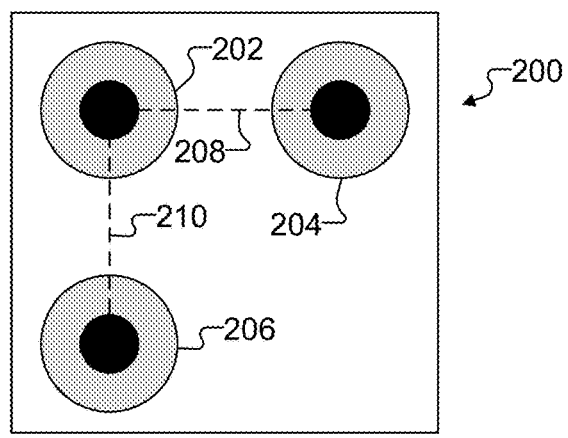
FIG. 2 illustrates an example imaging array for use with array-based depth estimation in accordance with this disclosure.

FIG. 2 illustrates an example imaging array 200 for use with array-based depth estimation in accordance with this disclosure. For ease of explanation, the imaging array 200 of FIG. 2 may be described as being used in the electronic device 101 of FIG. 1. For example, the imaging array 200 of FIG. 2 may represent one or more sensors 180 in the electronic device 101 of FIG. 1. However, the imaging array 200 may be used with any suitable device(s) and in any suitable system(s).

As shown in FIG. 2, the imaging array 200 includes three imaging sensors 202, 204, and 206 that are arranged in a right-angle triangle pattern. Each imaging sensor 202, 204, and 206 captures image data that is used to form image frames of scenes. The actual image frames may be generated by the imaging sensors 202, 204, and 206 or by the processor 120 that receives the image data from the imaging sensors 202, 204, and 206. The generated image frames may contain any suitable image-related data, such as red-green-blue (RGB) image data, luminance and chrominance (YUV) image data, or raw image data.

In this example, the imaging sensors 202 and 204 are separated horizontally along a baseline direction 208, and the imaging sensors 202 and 206 are separated vertically along a baseline direction 210. In the following discussion, image frames captured using the imaging sensor 202 may be referred to as reference image frames. Image frames captured using the imaging sensor 204 may be referred to as horizontal image frames since the imaging sensor 204 is positioned horizontally relative to the imaging sensor 202. Image frames captured using the imaging sensor 206 may be referred to as vertical image frames since the imaging sensor 206 is positioned vertically relative to the imaging sensor 202. The horizontal and vertical image frames may represent non-reference image frames. Note, however, that these connotations are for convenience only and can vary as needed or desired. For instance, the imaging sensor 204 or 206 may be used to generate reference image frames, and appropriate corrections may be made to the processing of the other image frames.

Figure 3A:
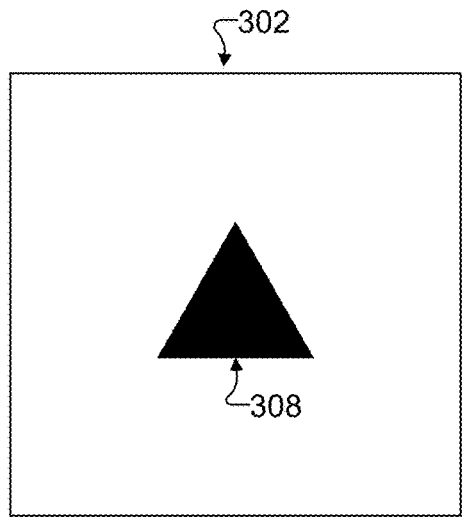
FIGS. 3A, 3B, and 3C illustrate example disparities in image frames captured using the imaging array of FIG. 2 in accordance with this disclosure.
Figure 3B:
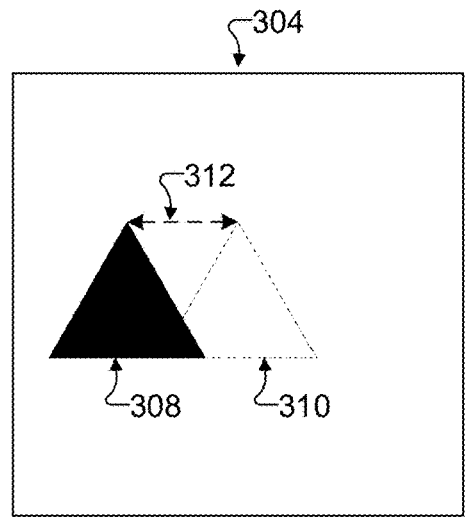
Figure 3C:
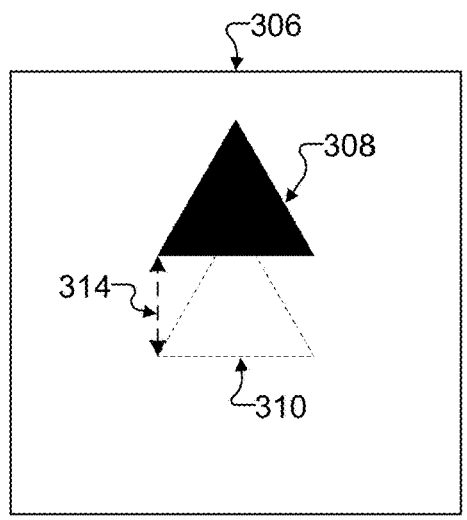

Because of the offsets of the imaging sensors 202, 204, and 206 in the baseline directions 208 and 210, image frames captured using the imaging sensors have various levels of disparities, which depend on the depths of objects or backgrounds in the scene being imaged. FIGS. 3A, 3B, and 3C illustrate example disparities in image frames captured using the imaging array 200 of FIG. 2 in accordance with this disclosure. In particular, FIG. 3A represents a reference image frame 302 captured using the imaging sensor 202, FIG. 3B represents a horizontal image frame 304 captured using the imaging sensor 204, and FIG. 3C represents a vertical image frame 306 captured using the imaging sensor 206.

As can be seen here, all three image frames 302, 304, and 306 capture an object 308, which in this example simply represents a triangular shape. A ghost object 310 in FIGS. 3B and 3C illustrates the position of the object 308 from the reference image frame 302 of FIG. 3A. As shown in FIG. 3B, there is a horizontal disparity 312 between the object 308 and the ghost object 310 along the baseline direction 208. As shown in FIG. 3C, there is a vertical disparity 314 between the object 308 and the ghost object 310 along the baseline direction 210.

As described in more detail below, the electronic device 101 or other device can process three or more image frames of a scene and generate multiple disparity maps that identify disparities between the image frames along multiple baseline directions. The electronic device 101 or other device can also generate confidence maps that identify different levels of confidence for the disparities identified in the disparity maps along the associated baseline directions. The electronic device 101 or other device can further fuse this information into a highly-accurate depth map for the scene.

Note that the baseline directions 208 and 210 shown here and described as being used by the approaches discussed below are used for simplicity since they are orthogonal. However, any other suitable baseline directions, whether orthogonal or not, may be used. Also note that while often described as involving the use of three image frames captured using three imaging sensors, the approaches described below can be easily expanded for use with four or more imaging sensors.

Although FIG. 2 illustrates one example of an imaging array 200 for use with array-based depth estimation, various changes may be made to FIG. 2. For example, an imaging array may include three or more imaging sensors in any suitable arrangement, as long as the imaging sensors define multiple different baseline directions between various ones of the imaging sensors. Although FIGS. 3A, 3B, and 3C illustrate one example of disparities in image frames captured using the imaging array 200 of FIG. 2, various changes may be made to FIGS. 3A, 3B, and 3C. For instance, the horizontal and vertical disparities 312 and 314 here can easily vary based on the actual depth of the object 308 relative to the imaging sensors 202, 204, and 206. Also, unless the imaging array 200 is perfectly squared with a scene, captured image frames will routinely include both horizontal and vertical disparities relative to a reference image frame.

Figure 4:
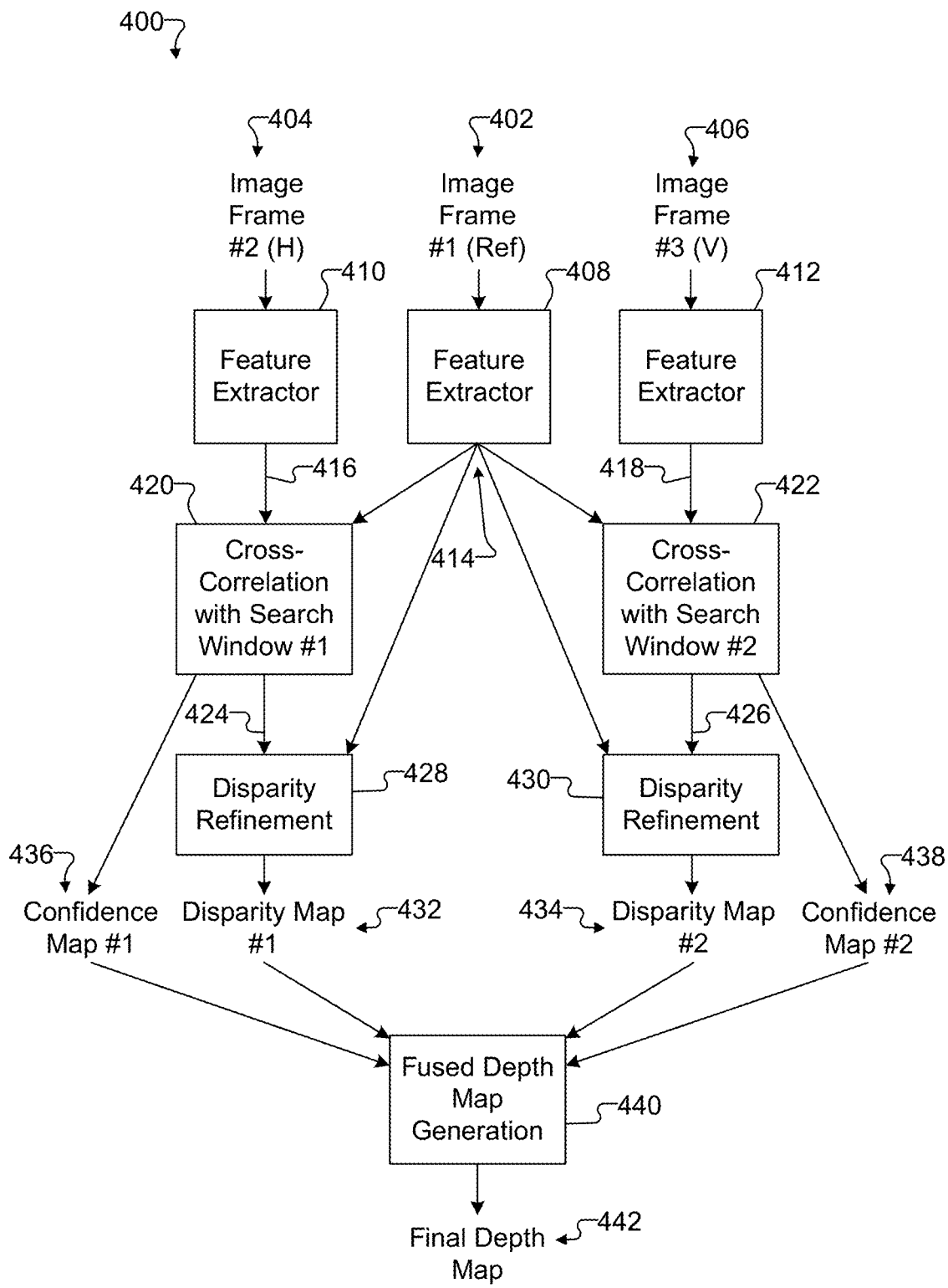
FIG. 4 illustrates an example technique for array-based depth estimation in accordance with this disclosure.

FIG. 4 illustrates an example technique 400 for array-based depth estimation in accordance with this disclosure. For ease of explanation, the technique 400 of FIG. 4 may be described as being used by the electronic device 101 of FIG. 1, which may include the imaging array 200 of FIG. 2. However, the technique 400 may be used with any suitable device(s) having any suitable imaging array(s) and in any other suitable system(s).

As shown in FIG. 4, the technique 400 receives and processes three input image frames 402, 404, and 406. The image frame 402 represents a reference image frame, which in some embodiments may be captured using the imaging sensor 202. The image frames 404 and 406 respectively represent a horizontal image frame and a vertical image frame, which in some embodiments may be captured using the imaging sensors 204 and 206. Each image frame 402, 404, and 406 may have a resolution defined by a height H and a width W, so the image frames 402, 404, and 406 collectively have a resolution of (H, W, 3).

The image frame 402 is provided to a feature extractor 408, which processes the image frame 402 to identify a feature map 414 containing high-level features of the image frame 402. The image frame 404 is provided to a feature extractor 410, which processes the image frame 404 to identify a feature map 416 containing high-level features of the image frame 404. The image frame 406 is provided to a feature extractor 412, which processes the image frame 406 to identify a feature map 418 containing high-level features of the image frame 406. Each feature extractor 408, 410, and 412 may represent a trained machine learning model or other algorithm for identifying features of image frames. Each feature extractor 408, 410, and 412 may use any suitable technique to identify features of input image frames, such as when implemented using multiple layers of a trained convolutional neural network (CNN). Note that multiple feature extractors 408, 410, and 412 are shown here, and the same weights used for feature extraction may be shared between the feature extractors 408, 410, and 412.

The feature maps 414 and 416 are processed using a cross-correlation function 420. The cross-correlation function 420 uses a sliding search window along one baseline direction (such as the baseline direction 208) to identify correlations between the feature maps 414 and 416 of the image frames 402 and 404. These correlations are used later to identify how common points in a scene are captured at different pixel locations in the image frames 402 and 404, thereby identifying disparities associated with the image frames 402 and 404. Similarly, the feature maps 414 and 418 are processed using a cross-correlation function 422. The cross-correlation function 422 uses a sliding search window along another baseline direction (such as the baseline direction 210) to identify correlations between the feature maps 414 and 418 of the image frames 402 and 406. These correlations are used later to identify how common points in the scene are captured at different pixel locations in the image frames 402 and 406, thereby identifying disparities associated with the image frames 402 and 406. Each cross-correlation function 420 and 422 may represent a trained machine learning model or other algorithm for identifying correlations between features of image frames. Each cross-correlation function 420 and 422 may use any suitable technique to identify correlations between features of input image frames, such as when implemented using one or more layers of a trained CNN.

Outputs of the cross-correlation function 420 include a set of correlated feature maps 424, which identify correlated features of the image frames 402 and 404 determined by the cross-correlation function 420 along the baseline direction 208. Multiple correlated feature maps 424 can be identified here, such as one correlated feature map 424 for each position of the sliding search window used by the cross-correlation function 420. Similarly, outputs of the cross-correlation function 422 include a set of correlated feature maps 426, which identify correlated features of the image frames 402 and 406 determined by the cross-correlation function 422 along the baseline direction 210. Multiple correlated feature maps 426 can be identified here, such as one correlated feature map 426 for each position of the sliding search window used by the cross-correlation function 422. In some embodiments, the correlated feature maps 424 or 426 collectively have a resolution of (H', W', $C_w$), where H'<H, W'<W, and $C_w$ represents the size of the sliding search window used by the cross-correlation function 420 or 422.

The correlated feature maps 424 are processed by a disparity refinement function 428, which restores the spatial resolution of the correlated feature maps 424 following the cross-correlation function 420 to produce a disparity map 432 for the baseline direction 208. During the restoration process, the feature map 414 associated with the reference image frame 402 can be used by the disparity refinement function 428. In some embodiments, the disparity map 432 has a resolution of (H, W). Similarly, the correlated feature maps 426 are processed by a disparity refinement function 430, which restores the spatial resolution of the correlated feature maps 426 following the cross-correlation function 422. For example, the disparity refinement function 430 can be used to produce a disparity map 434 for the baseline direction 210. During the restoration process, the feature map 414 associated with the reference image frame 402 can be used by the disparity refinement function 430. In some embodiments, the disparity map 434 has a resolution of (H, W). Each disparity refinement function 428 and 430 may represent a trained machine learning model or other algorithm for restoring spatial resolution of correlated feature maps to produce disparity maps. Each disparity refinement function 428 and 430 may use any suitable technique to restore spatial resolution of correlated feature maps to produce disparity maps, such as when implemented using one or more layers of a trained CNN.

Another output of the cross-correlation function 420 is a confidence map 436, which identifies the confidence levels associated with the correlated features identified by the cross-correlation function 420 in the correlated feature maps 424. In some embodiments, the confidence map 436 can be generated by applying softmax and argmax operations to the correlated feature maps 424 along the channel dimension in order to extract the maximum values along the channel dimension. This produces an initial confidence map, which in some embodiments has a resolution of (H', W'). The initial confidence map can then be upsampled to have the same spatial dimensions as the input image frames 402 and 404, which in some embodiments means a resolution of (H, W). Similarly, another output of the cross-correlation function 422 is a confidence map 438, which identifies the confidence levels associated with the correlated features identified by the cross-correlation function 422 in the correlated feature maps 426. In some embodiments, the confidence map 438 can be generated by applying softmax and argmax operations to the correlated feature maps 426 along the channel dimension in order to extract the maximum values along the channel dimension. This produces an initial confidence map, which in some embodiments has a resolution of (H', W'). The initial confidence map can then be upsampled to have the same spatial dimensions as the input image frames 402 and 406, which in some embodiments means a resolution of (H, W).

A fused depth map generation function 440 receives the disparity maps 432 and 434 and the confidence maps 436 and 438. The fused depth map generation function 440 uses these inputs to produce a final depth map 442 for the scene captured in the input image frames 402, 404, and 406. For example, the fused depth map generation function 440 may scale the disparity values contained in the disparity map 432 or depth values based on the disparity values contained in the disparity map 432 using the confidence values contained in the confidence map 436. The fused depth map generation function 440 may also scale the disparity values contained in the disparity map 434 or depth values based on the disparity values contained in the disparity map 434 using the confidence values contained in the confidence map 438. In addition, the fused depth map generation function 440 may use the scaled disparity or depth values to identify final depth values contained in the depth map 442.

Although FIG. 4 illustrates one example of a technique 400 for array-based depth estimation, various changes may be made to FIG. 4. For example, various components in FIG. 4 may be combined, further subdivided, replicated, omitted, or rearranged and additional components may be added according to particular needs. As a particular example, more than two non-reference input image frames may be received and processed. In that case, an additional feature extractor, an additional cross-correlation function, and an additional disparity refinement function may be used in the technique 400 to process each additional non-reference input image frame. Also, the fused depth map generation function 440 may be configured to process an additional disparity map and an additional confidence map for each additional non-reference input image frame. As another particular example, the same feature extractor may be used to serially process multiple input image frames to produce feature maps, the same cross-correlation function may be used to serially process different pairs of feature maps using different directions for its sliding search window to produce correlated feature maps, and/or the same disparity refinement function may be used to serially process different correlated feature maps to produce disparity maps.

Figure 5:
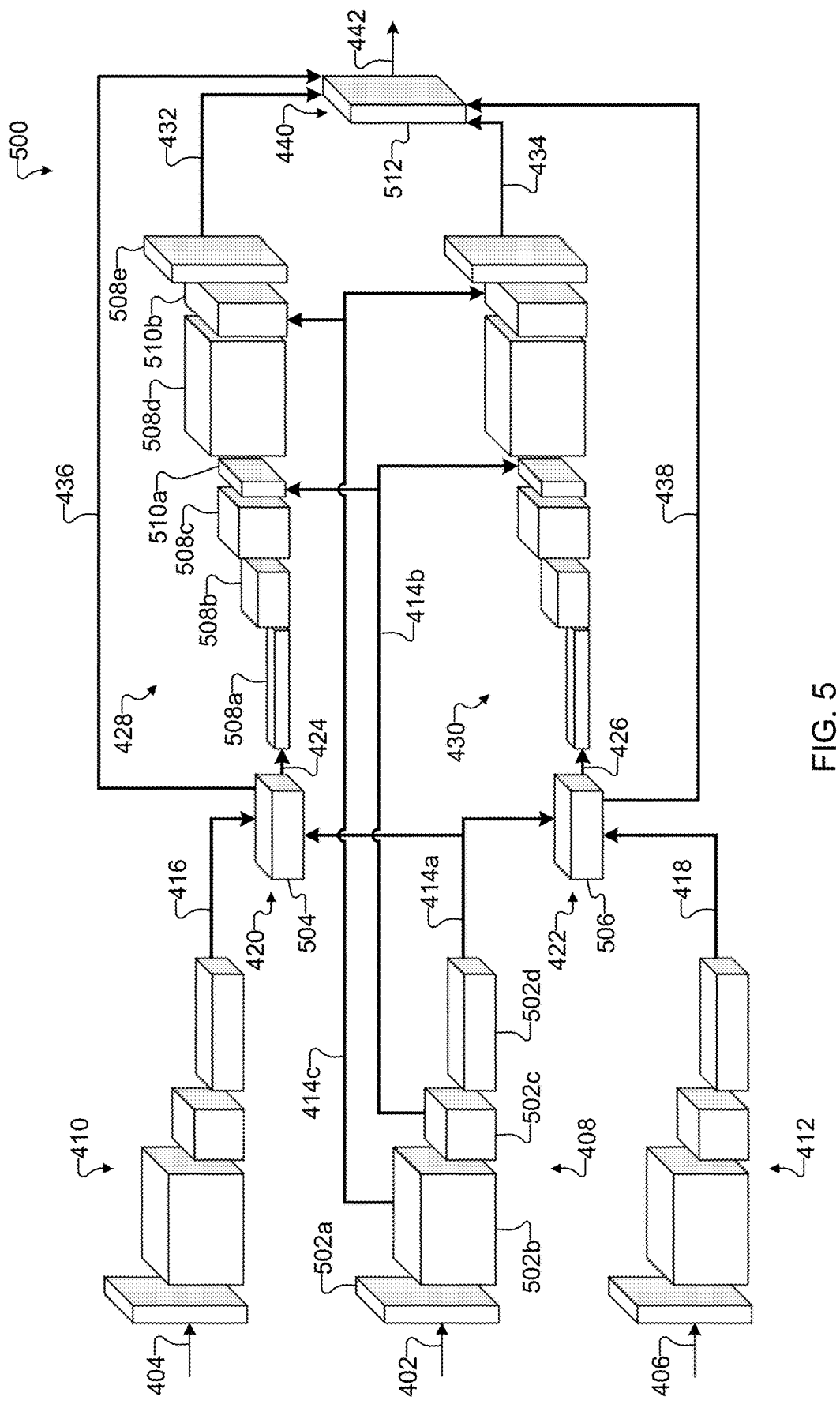
FIG. 5 illustrates an example machine learning-based architecture for array-based depth estimation in accordance with this disclosure.

FIG. 5 illustrates an example machine learning-based architecture 500 for array-based depth estimation in accordance with this disclosure. More specifically, the architecture 500 of FIG. 5 illustrates one example implementation of the technique 400 of FIG. 4. For ease of explanation, the architecture 500 of FIG. 5 may be described as being used by the electronic device 101 of FIG. 1, which may include the imaging array 200 of FIG. 2. However, the architecture 500 may be used with any suitable device(s) having any suitable imaging array(s) and in any other suitable system (s).

As shown in FIG. 5, the feature extractor 408 is implemented using a collection of convolutional layers 502a-502d, which are used to process the input image frame 402. Each convolutional layer 502a-502d applies a convolution function to its inputs in order to generate its outputs. A convolutional layer 502a-502d generally represents a layer of convolutional neurons, which apply a convolution function that emulates the response of individual neurons to visual stimuli. Each neuron typically applies some function to its input values (often by weighting different input values differently) to generate output values. A convolutional layer 502a-502d may be associated with an activation function, which can apply a specific function or operation to the output values from the neurons to produce final outputs of the convolutional layer. In this example, the first convolutional layer 502a receives and processes the input image frame 402, and each of the remaining convolutional layers 502b-502d receives and processes the outputs from the prior convolutional layer 502a-502c. The output of each convolutional layer 502a-502d has a lower resolution than its input.

The convolutional layer 502d outputs high-level features 414a, the convolutional layer 502c outputs high-level features 414b, and the convolutional layer 502b outputs high-level features 414c. The high-level features 414a-414c collectively represent the feature map 414 discussed above. The high-level features 414a represent the features that are used by the cross-correlation functions 420 and 422, and the high-level features 414b-414c represent the features that are used by the disparity refinement functions 428 and 430. Note that while four convolutional layers 502a-502d are shown here, the feature extractor 408 may support any suitable number of convolutional layers. Also note that the feature extractors 410 and 412 may be implemented using the same arrangement of convolutional layers 502a-502d, which can operate using the same weights that are used in the feature extractor 408, to produce high-level features in the feature maps 416 and 418, respectively.

Figure 6:
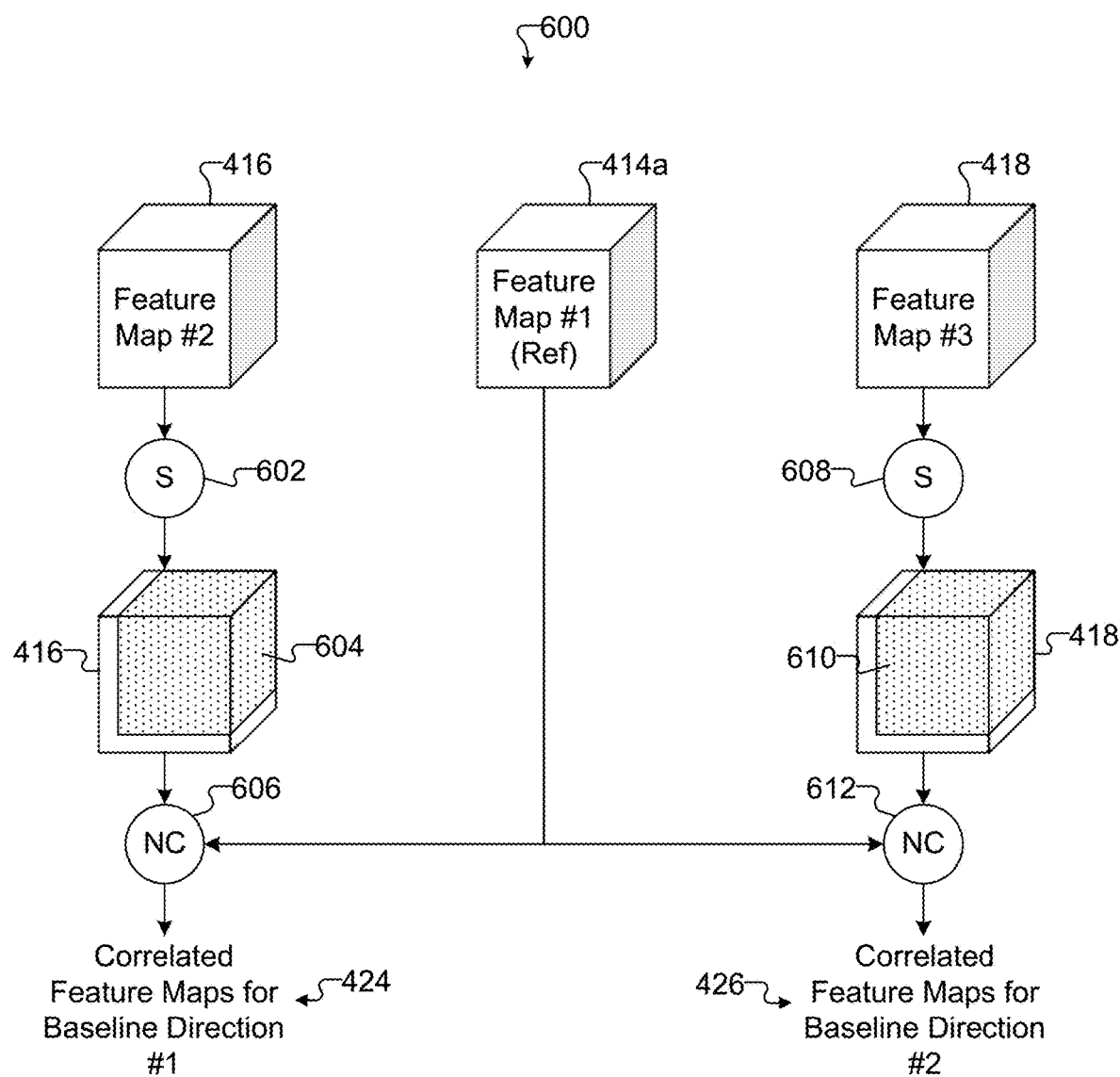
FIG. 6 illustrates an example technique for cross-correlation to support array-based depth estimation in accordance with this disclosure.
Figure 7:
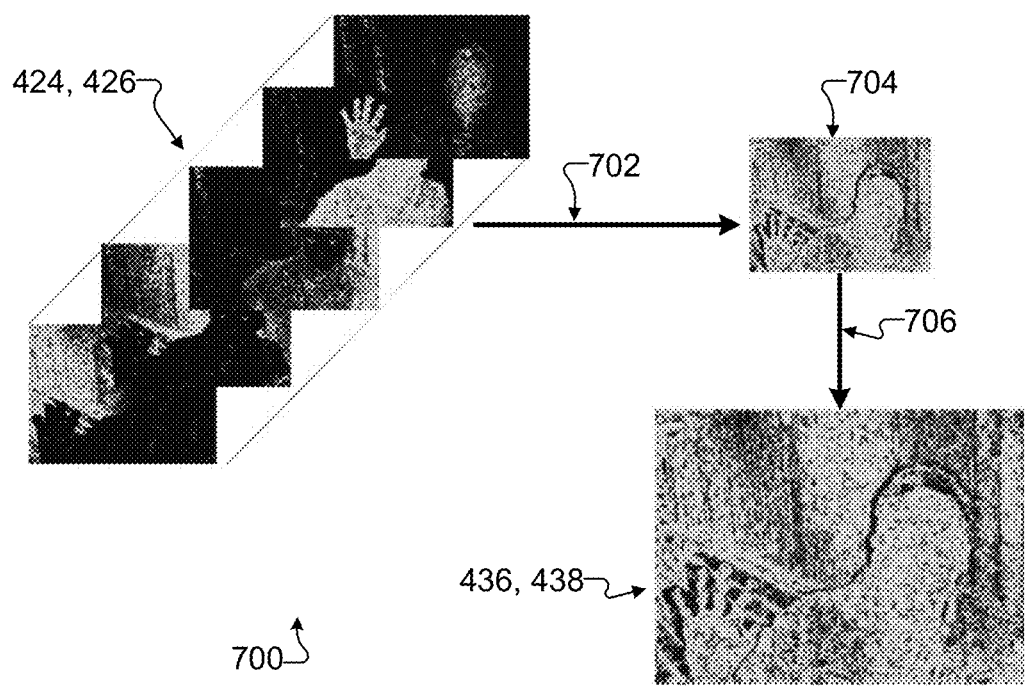
FIG. 7 illustrates an example technique for confidence map generation to support array-based depth estimation in accordance with this disclosure.

The cross-correlation function 420 is implemented using a cross-correlation layer 504, and the cross-correlation function 422 is implemented using a cross-correlation layer 506. Each cross-correlation layer 504 or 506 receives the high-level features 414a of the feature map 414 from the feature extractor 408 and the high-level features in the feature map 416 or 418 from the feature extractor 410 or 412. Each cross-correlation layer 504 or 506 uses a sliding search window to identify correlations between these features in order to produce correlated feature maps 424 or 426. The cross-correlation layers 504 and 506 slide their respective search windows along different baseline directions (such as along the baseline directions 208 and 210) in order to identify correlations between the input image frames along the different baseline directions. One example implementation of the cross-correlation layers 504 and 506 is shown in FIGS. 6 and 7, which are described below.

The disparity refinement function 428 is implemented using a collection of deconvolutional or upsampling layers 508a-508e and convolutional layers 510a-510b, which are used to restore spatial resolution to the correlated feature maps 424 and produce the disparity map 432. Again, each convolutional layer 510a-510b applies a convolution function to its inputs in order to generate its outputs. Each deconvolutional or upsampling layer 508a-508e applies a deconvolution or upsampling function to its inputs in order to generate its outputs. In this example, the first deconvolutional or upsampling layer 508a receives and processes the correlated feature maps 424 produced by the cross-correlation layer 504, and each of the deconvolutional or upsampling layers 508b-508c receives and processes the outputs from the prior deconvolutional or upsampling layer 508a-508b. The outputs of the deconvolutional or upsampling layer 508c are provided to the convolutional layer 510a along with the high-level features 414b of the feature map 414 from the convolutional layer 502c, which allows the high-level features 414b for the reference input image frame 402 to be fed forward and concatenated with the outputs of the deconvolutional or upsampling layer 508c. The deconvolutional or upsampling layer 508d receives and processes the outputs of the convolutional layer 510a. The outputs of the deconvolutional or upsampling layer 508d are provided to the convolutional layer 510b along with the high-level features 414c of the feature map 414 from the convolutional layer 502b, which allows the high-level features 414c for the reference input image frame 402 to be fed forward and concatenated with the outputs of the deconvolutional or upsampling layer 508d. The deconvolutional or upsampling layer 508e receives and processes the outputs of the convolutional layer 510b to produce the disparity map 432. Note that while five deconvolutional or upsampling layers 508a-508e and two convolutional layers 510a-510b are shown here, the disparity refinement function 428 may support any suitable number of deconvolutional or upsampling layers and any suitable number of convolutional layers. Also note that the disparity refinement function 430 may be implemented using the same arrangement of layers 508a-508e, 510a-510b, which are used to restore spatial resolution to the correlated feature maps 426 and produce the disparity map 434.

Figure 8:
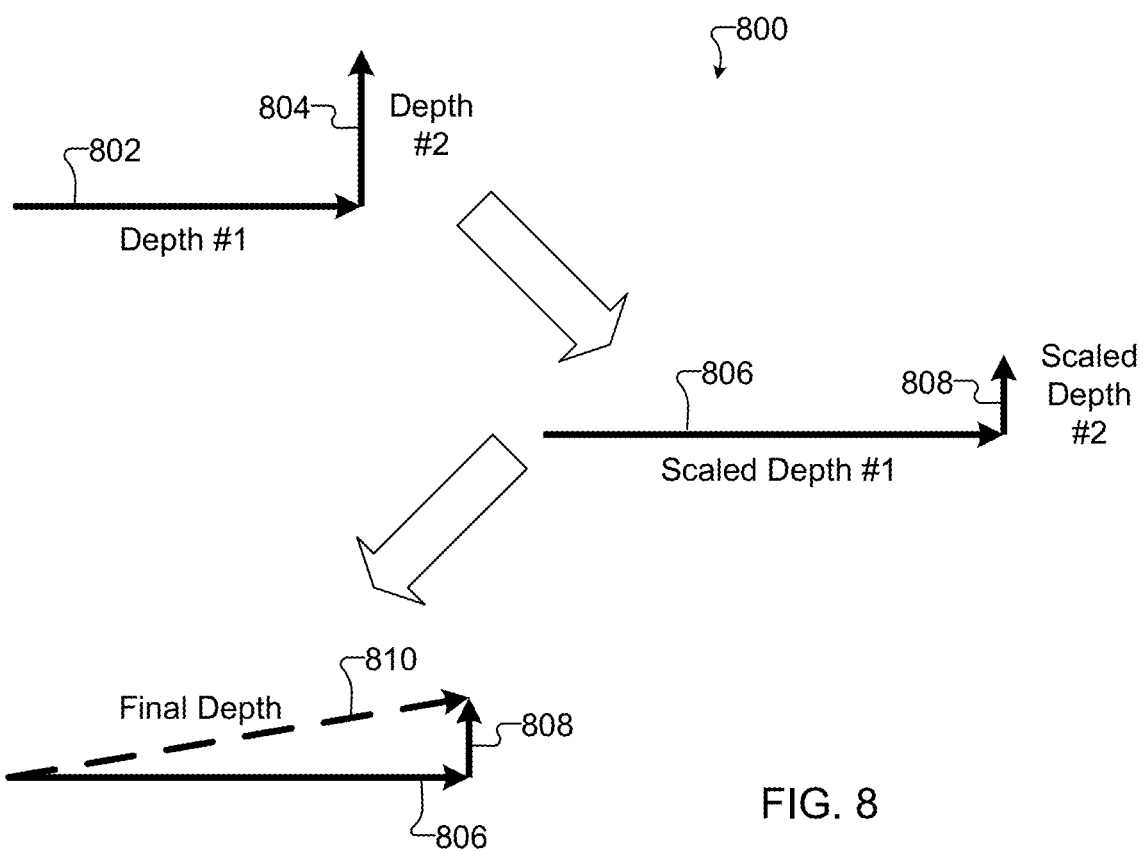
FIG. 8 illustrates an example technique for information fusion to support array-based depth estimation in accordance with this disclosure.

The fused depth map generation function 440 is implemented using a fusion layer 512, which receives the disparity maps 432 and 434 from the disparity refinement functions 428 and 430 and the confidence maps 436 and 438 from the cross-correlation functions 420 and 422. The fusion layer 512 uses this information to produce the final depth map 442 of the scene that is captured in the input image frames 402, 404, and 406. One example technique for fusing disparity maps and confidence maps is shown in FIG. 8, which is described below.

Although FIG. 5 illustrates one example of a machine learning-based architecture 500 for array-based depth estimation, various changes may be made to FIG. 5. For example, various components in FIG. 5 may be combined, further subdivided, replicated, omitted, or rearranged and additional components may be added according to particular needs. As a particular example, more than two non-reference input image frames may be received and processed. In that case, layers for an additional feature extractor, an additional cross-correlation function, and an additional disparity refinement function may be provided, and the layer 512 for the fused depth map generation function 440 may be configured to process an additional disparity map and an additional confidence map for each additional non-reference input image frame. As another particular example, the same layers for a feature extractor may be used to serially process multiple input image frames, the same layer(s) for a cross-correlation function may be used to serially process different pairs of feature maps using different directions for its sliding search window, and/or the same layers for a disparity refinement function may be used to serially process different correlated feature maps.

FIG. 6 illustrates an example technique 600 for cross-correlation to support array-based depth estimation in accordance with this disclosure. More specifically, the technique 600 of FIG. 6 illustrates one example implementation of part of the cross-correlation functions 420 and 422 in the technique 400 of FIG. 4. For ease of explanation, the technique 600 of FIG. 6 may be described as being used by the electronic device 101 of FIG. 1, which may include the imaging array 200 of FIG. 2. However, the technique 600 may be used with any suitable device(s) having any suitable imaging array(s) and in any other suitable system(s).

As shown in FIG. 6, the high-level features 414a of the feature map 414 and the feature maps 416 and 418 are received as inputs. The feature map 416 is provided to a shift function 602, which operates to shift a sliding window 604 within the feature map 416 along one baseline direction (such as the baseline direction 208). The contents of the feature map 416 within the sliding window 604 are provided to a normalized correlation function 606, which also receives the high-level features 414a of the feature map 414. The normalized correlation function 606 calculates a normalized correlation or cross-correlation between the contents of the feature map 416 within the sliding window 604 and the high-level features 414a of the feature map 414, thereby producing one of the correlated feature maps 424. A correlated feature map 424 can be produced for each position of the sliding window 604 within the feature map 416. The number of times that the shift function 602 can shift the sliding window 604 within the feature map 416 depends on how large the sliding window 604 is relative to the feature map 416.

Similarly, the feature map 418 is provided to a shift function 608, which operates to shift a sliding window 610 within the feature map 418 along another baseline direction (such as the baseline direction 210). The contents of the feature map 418 within the sliding window 610 are provided to a normalized correlation function 612, which also receives the high-level features 414a of the feature map 414. The normalized correlation function 612 calculates a normalized correlation or cross-correlation between the contents of the feature map 418 within the sliding window 610 and the high-level features 414a of the feature map 414, thereby producing one of the correlated feature maps 426. A correlated feature map 426 can be produced for each position of the sliding window 610 within the feature map 418. The number of times that the shift function 608 can shift the sliding window 610 within the feature map 418 depends on how large the sliding window 610 is relative to the feature map 418.

FIG. 7 illustrates an example technique 700 for confidence map generation to support array-based depth estimation in accordance with this disclosure. More specifically, the technique 700 of FIG. 7 illustrates one example implementation of another part of the cross-correlation functions 420 and 422 in the technique 400 of FIG. 4. For ease of explanation, the technique 700 of FIG. 7 may be described as being used by the electronic device 101 of FIG. 1, which may include the imaging array 200 of FIG. 2. However, the technique 700 may be used with any suitable device(s) having any suitable imaging array(s) and in any other suitable system(s).

As shown in FIG. 7, the correlated feature maps 424 or 426 produced by the cross-correlation function 420 or 422 (such as in the manner described above with reference to FIG. 6) are used. One or more operations 702 are applied to the correlated feature maps 424 or 426 in order to produce an initial confidence map 704, such as a lower-resolution confidence map. The operations 702 may include a softmax operation applied along the channel direction of the correlated feature maps 424 or 426 followed by an argmax operation applied along the channel direction of the correlated feature maps 424 or 426. The softmax operation generally remaps the values of the correlated feature maps 424 or 426 to a desired probability distribution, while the argmax operation returns the largest values from the remapped correlated feature maps 424 or 426. An upsampling operation 706 is then performed to increase the resolution of the initial confidence map 704 to produce one of the confidence maps 436 or 438, which has a higher resolution than the initial confidence map 704.

Although FIG. 6 illustrates one example of a technique 600 for cross-correlation to support array-based depth estimation, various changes may be made to FIG. 6. For example, the technique 600 in FIG. 6 implements both of the cross-correlation functions 420 and 422 from FIG. 4. More specifically, the left half of FIG. 6 implements the cross-correlation function 420, and the right half of FIG. 6 implements the cross-correlation function 422. However, the cross-correlation functions 420 and 422 may be implemented separately (such as in the different layers 504 and 506) since the only link between the cross-correlation functions 420 and 422 in FIG. 6 is the common receipt of the high-level features 414a of the feature map 414. Although FIG. 7 illustrates one example of a technique 700 for confidence map generation to support array-based depth estimation, various changes may be made to FIG. 7. For instance, the number of correlated feature maps 424 or 426 can vary as needed or desired, and the contents of the correlated feature maps 424 or 426 and confidence maps 704 and 706 are for illustration only.

FIG. 8 illustrates an example technique 800 for information fusion to support array-based depth estimation in accordance with this disclosure. More specifically, the technique 800 of FIG. 8 illustrates one example of the operations that may be performed by the fused depth map generation function 440. For ease of explanation, the technique 800 of FIG. 8 may be described as being used by the electronic device 101 of FIG. 1, which may include the imaging array 200 of FIG. 2. However, the technique 800 may be used with any suitable device(s) having any suitable imaging array(s) and in any other suitable system(s).

As described above, the fused depth map generation function 440 uses disparity maps 432 and 434 and confidence maps 436 and 438 to produce a final depth map 442 for a scene captured in input image frames 402, 404, and 406. In some embodiments, the fused depth map generation function 440 uses four values to determine each depth value in the final depth map 442, namely (i) a disparity value from the disparity map 432 or a depth value based on a disparity value from the disparity map 432, (ii) the confidence level of that disparity or depth value from the confidence map 436, (iii) a disparity value from the disparity map 434 or a depth value based on a disparity value from the disparity map 434, and (iv) the confidence level of that disparity or depth value from the confidence map 438. In particular embodiments, each depth value in the final depth map 442 may be determined using these four values as follows:

$$D'_1 = D_1 \times C_1$$

$$D'_2 = D_2 \times C_2$$

$$D = \sqrt{D'^2_1 \times D'^2_2}$$

Here, $D_1$ and $D_2$ represent depth values based on disparity values contained in the disparity maps 432 and 434, and $C_1$ and $C_2$ represent confidence levels from the confidence maps 436 and 438 for those depth values. Also, $D_1'$ and $D_2'$ represent the depth values as scaled by their confidence levels, and D represents the computed depth value for the final depth map 442.

An example of these operations is shown in FIG. 8, where the fused depth map generation function 440 is operating to convert two depth values 802 and 804 (which represent depth values along the two baseline directions 208 and 210) into two scaled depth values 806 and 808. In this example, the scaled depth value 806 is larger than the original depth value 802, while the scaled depth value 808 is smaller than the original depth value 804. This indicates that the confidence level for the depth value 802 was higher than the confidence level for the depth value 804, so the original depth value 802 is being weighted more than the original depth value 804. A final depth value 810 may then be computed based on the scaled depth values 806 and 808. Since the baseline directions 208 and 210 described above are orthogonal, the scaled depth values 806 and 808 here are also shown as being orthogonal. This allows the final depth value 810 to be easily calculated as described above. However, as shown below, this process can be easily modified to support the use of non-orthogonal baseline directions.

Although FIG. 8 illustrates one example of a technique 800 for information fusion to support array-based depth estimation, various changes may be made to FIG. 8. For example, the fused depth map generation function 440 may use any other suitable technique to scale disparity or depth values and combine the scaled disparity or depth values in order to produce final depth values for a scene.

Note that the functions and other operations described above with reference to FIGS. 4, 5, 6, 7, and 8 can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Figure 9A:
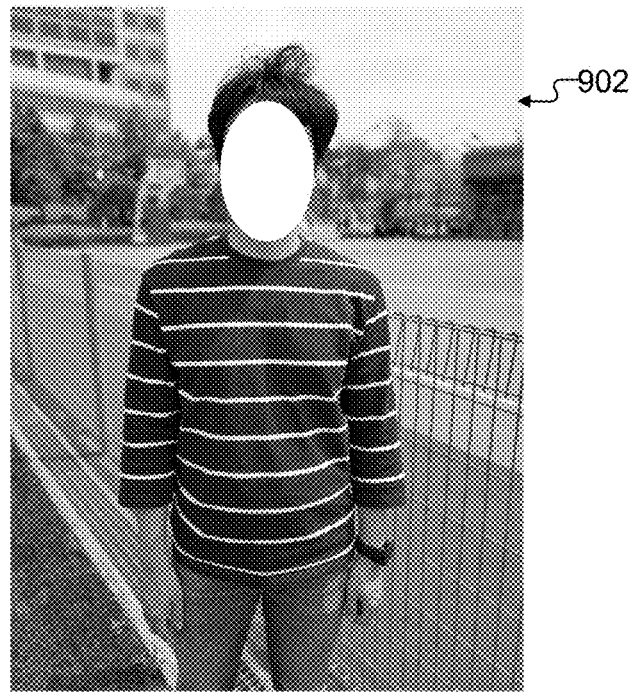
FIGS. 9A, 9B, and 9C illustrate example results that may be obtained using array-based depth estimation in accordance with this disclosure.
Figure 9B:
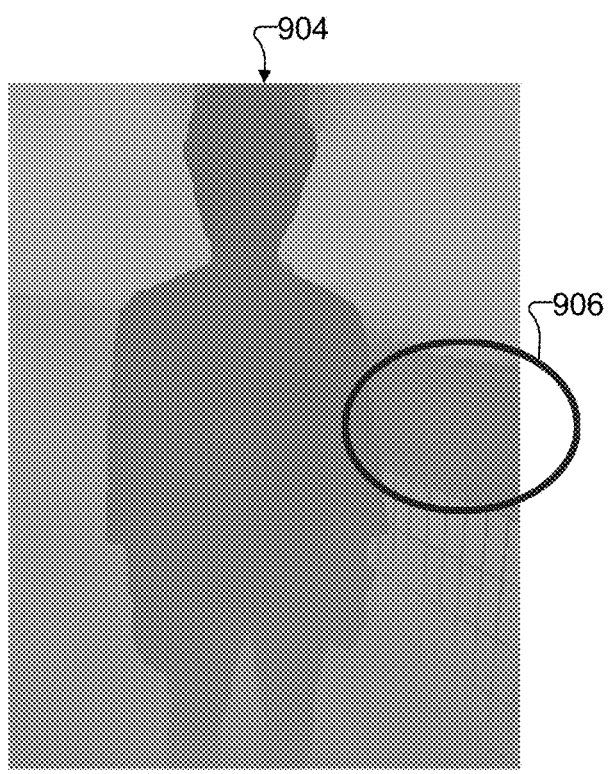
Figure 9C:

FIGS. 9A, 9B, and 9C illustrate example results that may be obtained using array-based depth estimation in accordance with this disclosure. These results may, for example, be obtained using the technique 400 described above. In FIG. 9A, an input image frame 902 of a scene is shown. Here, the input image frame 902 shows a person (whose face is obscured for privacy) standing in front of a tennis court. In FIG. 9B, a depth map 904 is shown for the scene and may be generated using a conventional approach based the input image frame 902 and another input image frame (such as left and right input image frames). As can be seen here, the depth map 904 suffers from various problems, such as where the conventional approach has difficulty discerning depths in an area 906 of the scene associated with a repetitive pattern. In FIG. 9C, a depth map 908 is shown for the same scene and may be generated using the technique 400 based on the input image frame 902 and at least two other input image frames. As can be seen here, the depth map 908 much more accurately identifies depths within the scene, including in the area of the scene associated with the repetitive pattern.

Although FIGS. 9A, 9B, and 9C illustrate examples of results that may be obtained using array-based depth estimation, various changes may be made to these figures. For example, these figures are merely meant to illustrate one example of the types of results that could be obtained using the approaches described in this disclosure. Obviously, images of scenes can vary widely, and the results obtained using the approaches described in this patent document can also vary widely depending on the circumstances.

Figure 10A:
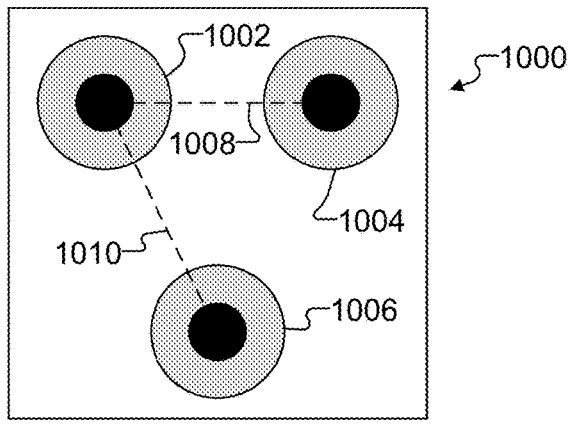
FIGS. 10A and 10B illustrate another example imaging array for use with array-based depth estimation and related details in accordance with this disclosure.
Figure 10B:
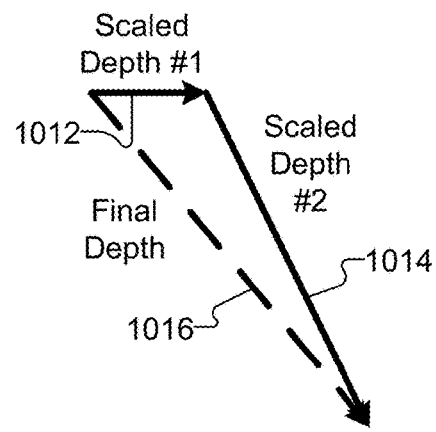

FIGS. 10A and 10B illustrate another example imaging array 1000 for use with array-based depth estimation and related details in accordance with this disclosure. For ease of explanation, the imaging array 1000 may be described as being used in the electronic device 101 of FIG. 1. For example, the imaging array 1000 may represent one or more sensors 180 in the electronic device 101 of FIG. 1. However, the imaging array 1000 may be used with any suitable device(s) and in any suitable system(s).

As shown in FIG. 10A, the imaging array 1000 includes three imaging sensors 1002, 1004, and 1006. Each imaging sensor 1002, 1004, and 1006 captures image data that is used to form image frames of scenes. The actual image frames may be generated by the imaging sensors 1002, 1004, and 1006 or by the processor 120 that receives the image data from the imaging sensors 1002, 1004, and 1006. The generated image frames may contain any suitable image-related data, such as RGB image data, YUV image data, or raw image data.

In this example, the imaging sensors 1002 and 1004 are separated horizontally along a baseline direction 1008, and the imaging sensors 1002 and 1006 are separated diagonally along a baseline direction 1010. Because of the offsets of the imaging sensors 1002, 1004, and 1006 in the baseline directions 1008 and 1010, image frames captured using the imaging sensors have various levels of disparities, which depend on the depths of objects or backgrounds in the scene being imaged.

The technique 400 shown in FIG. 4 and described above can be easily modified to support this arrangement of the imaging sensors 1002, 1004, and 1006. For example, the cross-correlation function 420 may process features for a reference image frame captured using the imaging sensor 1002 and a first non-reference image frame captured using the imaging sensor 1004 in the same or similar manner described above (since the baseline directions 208 and 1008 are both horizontal). The cross-correlation function 422 may process features for the reference image frame captured using the imaging sensor 1002 and a second non-reference image frame captured using the imaging sensor 1006 in a similar manner as described above, but the sliding window 610 used by the cross-correlation function 422 can slide in a diagonal direction corresponding the baseline direction 1010.

The fused depth map generation function 440 can also be modified to calculate final depth values based on non-orthogonal disparity or depth values. An example of this is shown in FIG. 10B, where two scaled depth values 1012 and 1014 may be used to calculate a depth valve 1016 for the final depth map 442. This may occur in a similar manner as described above, but the calculations can be easily adjusted to account for the non-orthogonal nature of the two scaled depth values 1012 and 1014 that correspond to the two non-orthogonal baseline directions 1008 and 1010.

Figure 11A:
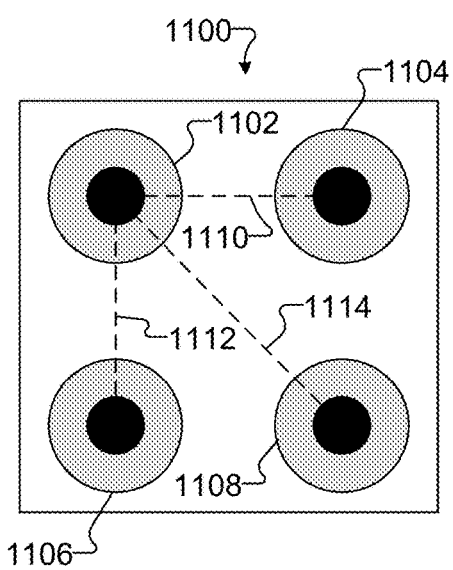
FIGS. 11A and 11B illustrate yet other example imaging arrays for use with array-based depth estimation in accordance with this disclosure.
Figure 11B:
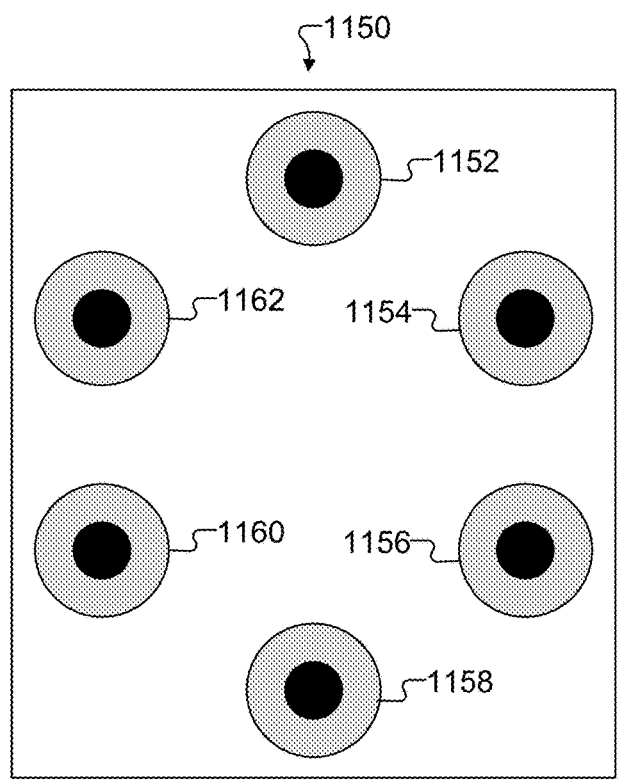

FIGS. 11A and 11B illustrate yet other example imaging arrays 1100 and 1150 for use with array-based depth estimation in accordance with this disclosure. For ease of explanation, the imaging arrays 1100 and 1150 may be described as being used in the electronic device 101 of FIG. 1. For example, the imaging arrays 1100 and 1150 may each represent one or more sensors 180 in the electronic device 101 of FIG. 1. However, the imaging arrays 1100 and 1150 may be used with any suitable device(s) and in any suitable system(s).

As shown in FIG. 11A, the imaging array 1100 includes four imaging sensors 1102, 1104, 1106, and 1108 that are arranged in a square pattern. Each imaging sensor 1102, 1104, 1106, and 1108 captures image data that is used to form image frames of scenes. The actual image frames may be generated by the imaging sensors 1102, 1104, 1106, and 1108 or by the processor 120 that receives the image data from the imaging sensors 1102, 1104, 1106, and 1108. The generated image frames may contain any suitable image-related data, such as RGB image data, YUV image data, or raw image data.

In this example, the imaging sensors 1102 and 1104 are separated horizontally along a baseline direction 1110, the imaging sensors 1102 and 1106 are separated vertically along a baseline direction 1112, and the imaging sensors 1102 and 1108 are separated diagonally along a baseline direction 1114. Because of the offsets of the imaging sensors 1102, 1104, 1106, and 1108 in the baseline directions 1110, 1112, and 1114, image frames captured using the imaging sensors have various levels of disparities, which depend on the depths of objects or backgrounds in the scene being imaged.

The technique 400 shown in FIG. 4 and described above can be easily modified to support this arrangement of the imaging sensors 1102, 1104, 1106, and 1108. For example, the cross-correlation function 420 may process features for a reference image frame captured using the imaging sensor 1102 and a first non-reference image frame captured using the imaging sensor 1104 in the same or similar manner described above (since the baseline directions 208 and 1110 are both horizontal). The cross-correlation function 422 may process features for the reference image frame captured using the imaging sensor 1102 and a second non-reference image frame captured using the imaging sensor 1106 in the same or similar manner described above (since the baseline directions 210 and 1112 are both vertical). An additional cross-correlation function may process features for the reference image frame captured using the imaging sensor 1102 and a third non-reference image frame captured using the imaging sensor 1108 in a similar manner as described above, but the sliding window used by the cross-correlation function can slide in a diagonal direction corresponding the baseline direction 1114 (rather than horizontally or vertically). The fused depth map generation function 440 can also be modified to calculate final depth values based on three disparity maps and three confidence maps, such as by scaling the disparity values in the disparity maps or depth values based on the disparity values in the disparity maps with confidence levels in the confidence maps and combining the results.

As shown in FIG. 11B, the imaging array 1150 includes six imaging sensors 1152, 1154, 1156, 1158, 1160, and 1162 that are arranged in a hexagonal pattern. Each imaging sensor 1152, 1154, 1156, 1158, 1160, and 1162 captures image data that is used to form image frames of scenes. The actual image frames may be generated by the imaging sensors 1152, 1154, 1156, 1158, 1160, and 1162 or by the processor 120 that receives the image data from the imaging sensors 1152, 1154, 1156, 1158, 1160, and 1162. The generated image frames may contain any suitable image-related data, such as RGB image data, YUV image data, or raw image data.

In this example, one of the imaging sensors (such as the imaging sensor 1152) may be used to produce reference image frames, and other imaging sensors (such as the imaging sensors 1154, 1156, 1158, 1160, and 1162) are separated from the imaging sensor 1152 along various baseline directions. The technique 400 shown in FIG. 4 and described above can be easily modified to support this arrangement of the imaging sensors 1152, 1154, 1156, 1158, 1160, and 1162. For example, a cross-correlation function can be used for each of various pairs of imaging sensors, where each pair includes the imaging sensor 1152 and one of the imaging sensors 1154, 1156, 1158, 1160, and 1162. The sliding window used by each cross-correlation function can be moved in the appropriate direction based on the baseline direction associated with its pair of imaging sensors. The fused depth map generation function 440 can also be modified to calculate final depth values based on five disparity maps and five confidence maps, such as by scaling the disparity values in the disparity maps or depth values based on the disparity values in the disparity maps with confidence levels in the confidence maps and combining the results.

Although FIGS. 10A, 10B, 11A, and 11B illustrate other example imaging arrays 1100 and 1150 for use with array-based depth estimation and related details, various changes may be made to these figures. For example, these figures are merely meant to illustrate examples of possible alternative arrangements of imaging sensors within imaging arrays. As noted above, however, any number of imaging sensors may be used in any suitable arrangement, as long as the imaging sensors define multiple different baseline directions between various ones of the imaging sensors.

Note that in the descriptions of the various imaging arrays 200, 1000, 1100, and 1150 above, certain imaging sensors 202, 1002, 1102, and 1152 have been described as being used to capture reference image frames, while other sensors 204-206, 1004-1006, 1104-1108, and 1154-1162 have been described as being used to capture non-reference image frames. The specific selection of the imaging sensor used to capture reference image frames can vary based on the implementation. In fact, the specific selection of the imaging sensor used to capture reference image frames can vary dynamically if desired. As long as the cross-correlation functions know to shift their search windows along the appropriate baseline directions and the fused depth map generation function knows how to combine the scaled disparity or depth values along the appropriate baseline directions, any suitable imaging sensor may be used to capture a reference input image frame. Also, while often described as being used to process still images of scenes, the same or similar approach may be used to process multiple captured images in video sequences.

Figure 12:
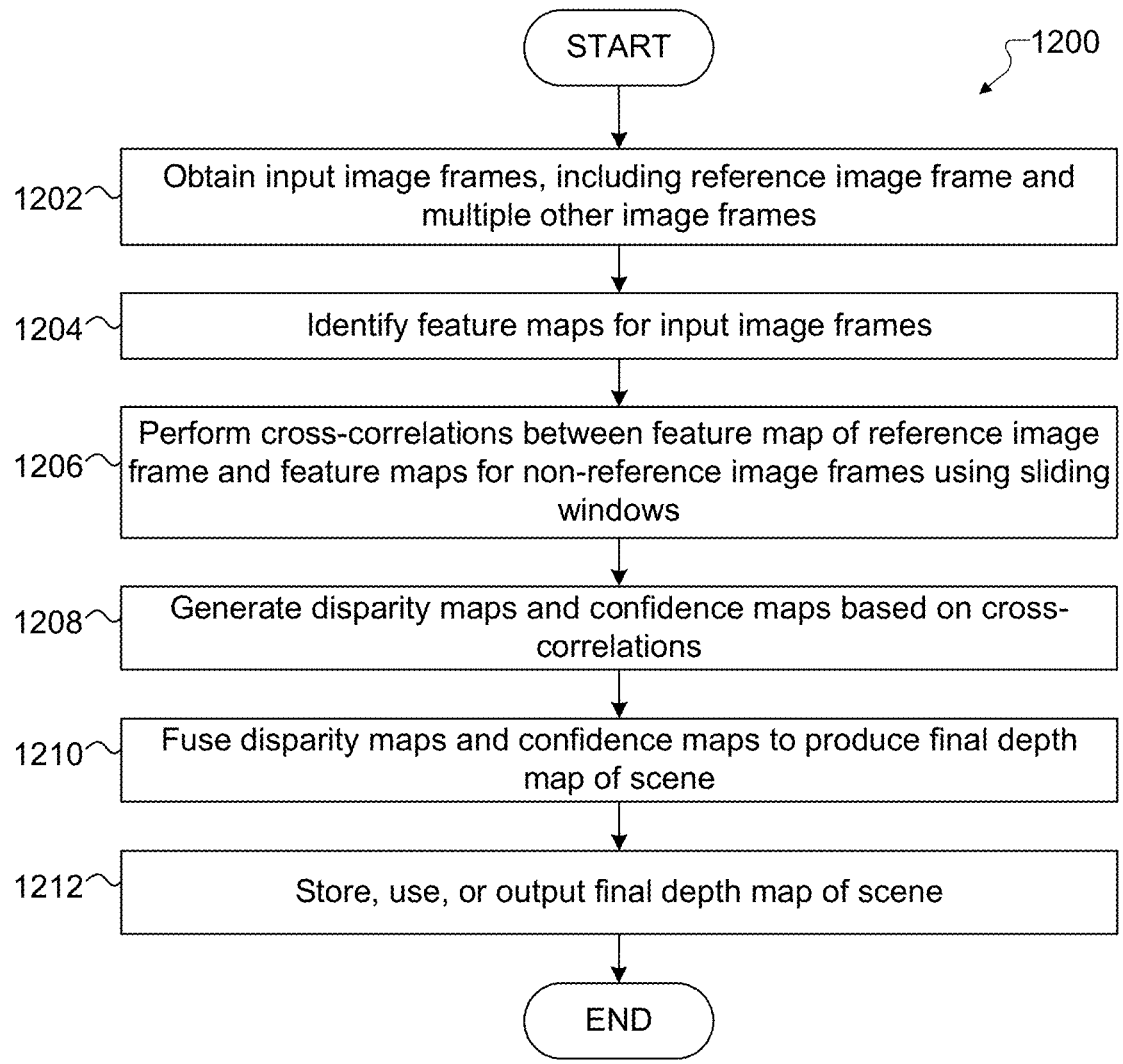
FIG. 12 illustrates an example method for array-based depth estimation in accordance with this disclosure.

FIG. 12 illustrates an example method 1200 for array-based depth estimation in accordance with this disclosure. For ease of explanation, the method 1200 of FIG. 12 may be described as being performed by the electronic device 101 of FIG. 1, which may use image frames captured using the imaging array 200 of FIG. 2. However, the method 1200 may be performed using any suitable device(s) having any suitable imaging array(s) and in any other suitable system(s).

As shown in FIG. 12, at least three input image frames of a scene are obtained at step 1202. This may include, for example, the processor 120 receiving image data from the imaging sensors 202, 204, and 206 and generating image frames 402, 404, and 406 based on the image data. The imaging sensors 202, 204, and 206 themselves may generate image frames 402, 404, and 406 and provide the image frames to the processor 120. The image frames include a reference image frame (such as the image frame 402) and multiple non-reference image frames (such as the image frames 404 and 406). Feature maps for the input image frames are identified at step 1204. This may include, for example, the processor 120 using the feature extractors 408, 410, and 412 to generate feature maps 414, 416, and 418 for the input image frames 402, 404, and 406.

Cross-correlations are performed between the feature map of the reference image frame and the feature maps of the non-reference image frames using sliding windows at step 1206. This may include, for example, the processor 120 performing the cross-correlation functions 420 and 422 with sliding windows 604 and 610 that move in different directions. The different directions are based on the baseline directions defined between the imaging sensor used to capture the reference image frame 402 (such as the imaging sensor 202) and the imaging sensors used to capture the non-reference image frames 404 and 406 (such as the imaging sensors 204 and 206). This may also include the cross-correlation functions 420 and 422 producing correlated feature maps 424 and 426 based on the cross-correlations.

Disparity maps and confidence maps are generated by the results of the cross-correlations at step 1208. This may include, for example, the processor 120 performing the disparity refinement functions 428 and 430 to convert the correlated feature maps 424 and 426 into disparity maps 432 and 434. This may also include the cross-correlation functions 420 and 422 performing the operations 702 using the correlated feature maps 424 and 426 to produce initial confidence maps 704 and performing the upsampling operations 706 to produce the higher-resolution confidence maps 436 and 438.

The disparity maps and confidence maps are fused to produce a final depth map of the scene at step 1210. This may include, for example, the processor 120 performing the fused depth map generation function 440 to scale disparity values contained in the disparity maps 432 and 434 or to scale depth values that are based on the disparity values contained in the disparity maps 432 and 434 using the confidence values contained in the confidence maps 436 and 438. This may also include the fused depth map generation function 440 using the scaled disparity or depth values to identify final depth values contained in the depth map 442.

The final depth map of the scene may be used in any suitable manner. For example, the final depth map of the scene may be stored, used, or output at step 1212. This may include, for example, the processor 120 performing one or more image processing operations using the final depth map. As particular examples, this may include the processor 120 using the final depth map to generate bokeh, perform depth-aware deblurring, or perform image relighting. As other particular examples, this may include the processor 120 using the final depth map to perform AR, MR, SLAM, odometry, or animoji-related functions.

Although FIG. 12 illustrates one example of a method 1200 for array-based depth estimation, various changes may be made to FIG. 12. For example, while shown as a series of steps, various steps in FIG. 12 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining, using one or more processors, at least three input image frames of a scene captured using at least three imaging sensors, the input image frames comprising a reference image frame and multiple non-reference image frames;
   generating, using the one or more processors, multiple disparity maps using the input image frames, wherein each disparity map is associated with the reference image frame and different ones of the disparity maps are associated with different ones of the non-reference image frames;
   generating, using the one or more processors, multiple confidence maps using the input image frames, wherein each confidence map identifies weights associated with one of the disparity maps; and
   generating, using the one or more processors, a depth map of the scene using the disparity maps and the confidence maps;
   wherein the imaging sensors are positioned to define different baseline directions, each baseline direction extending between the imaging sensor used to capture the reference image frame and one of the imaging sensors used to capture one of the non-reference image frames; and
   wherein generating the disparity maps comprises:
      generating multiple feature maps each identifying features of a different one of the input image frames using first convolutional layers;
      performing multiple cross-correlations each occurring between (i) at least part of the feature map of the reference image frame and (ii) a different one of the feature maps of the non-reference image frames, the cross-correlations producing different sets of correlated feature maps; and
      generating the disparity maps based on the sets of correlated feature maps using deconvolutional or upsampling layers and second convolutional layers.

2. The method of claim 1, wherein performing the cross-correlations comprises:
   shifting sliding windows within the feature maps of the non-reference image frames multiple times; and
   determining cross-correlations between the at least part of the feature map of the reference image frame and contents of the sliding windows within the feature maps of the non-reference image frames; and
   wherein the sliding windows are shifted in different directions in different ones of the feature maps of the non-reference image frames, the different directions associated with the baseline directions.

3. The method of claim 1, wherein generating the depth map comprises:
   scaling disparity values contained in the disparity maps or depth values that are based on the disparity values contained in the disparity maps with confidence levels contained in the confidence maps; and
   combining the scaled disparity or depth values to produce final depth values for the depth map.

4. The method of claim 1, wherein at least two of the baseline directions are not orthogonal to one another.

5. The method of claim 1, wherein the imaging sensors consist of one of:
   three imaging sensors arranged in a triangular pattern;
   four imaging sensors arranged in a square pattern; or
   six imaging sensors arranged in a hexagonal pattern.

6. The method of claim 1, wherein two or more of the baseline directions are substantially different from one another.

7. A method comprising:
   obtaining, using one or more processors, at least three input image frames of a scene captured using at least three imaging sensors, the input image frames comprising a reference image frame and multiple non-reference image frames;
   generating, using the one or more processors, multiple disparity maps using the input image frames, wherein each disparity map is associated with the reference image frame and different ones of the disparity maps are associated with different ones of the non-reference image frames;
   generating, using the one or more processors, multiple confidence maps using the input image frames, wherein each confidence map identifies weights associated with one of the disparity maps; and
   generating, using the one or more processors, a depth map of the scene using the disparity maps and the confidence maps;
   wherein the imaging sensors are positioned to define different baseline directions, each baseline direction extending between the imaging sensor used to capture the reference image frame and one of the imaging sensors used to capture one of the non-reference image frames, wherein generating the disparity maps comprises:
generating multiple feature maps each identifying features of a different one of the input image frames;
performing multiple cross-correlations each occurring between (i) at least part of the feature map of the reference image frame and (ii) a different one of the feature maps of the non-reference image frames, the cross-correlations producing different sets of correlated feature maps; and
generating the disparity maps using the sets of correlated feature maps; and wherein generating the confidence maps comprises, for each set of correlated feature maps:
identifying maximum values in the set of correlated feature maps;
generating a lower-resolution confidence map based on the identified maximum values; and
upsampling the lower-resolution confidence map to produce a higher-resolution confidence map.

8. The method of claim 7, wherein:
each of the input image frames is processed using first convolutional layers to generate one of the feature maps; and
each set of correlated feature maps is processed using deconvolutional or upsampling layers and second convolutional layers to generate one of the disparity maps.

9. An apparatus comprising:
at least three imaging sensors; and
at least one processor configured to:
obtain at least three input image frames of a scene using the at least three imaging sensors, the input image frames comprising a reference image frame and multiple non-reference image frames;
generate multiple disparity maps using the input image frames, wherein each disparity map is associated with the reference image frame and different ones of the disparity maps are associated with different ones of the non-reference image frames;
generate multiple confidence maps using the input image frames, wherein each confidence map identifies weights associated with one of the disparity maps; and
generate a depth map of the scene using the disparity maps and the confidence maps;

wherein the imaging sensors are positioned to define different baseline directions, each baseline direction extending between the imaging sensor used to capture the reference image frame and one of the imaging sensors used to capture one of the non-reference image frames; and wherein, to generate the disparity maps, the at least one processor is configured to:
generate multiple feature maps each identifying features of a different one of the input image frames using first convolutional layers;
perform multiple cross-correlations, each occurring between (i) at least part of the feature map of the reference image frame and (ii) a different one of the feature maps of the non-reference image frames, to produce different sets of correlated feature maps; and
generate the disparity maps based on the sets of correlated feature maps using deconvolutional or upsampling layers and second convolutional layers.

10. The apparatus of claim 9, wherein the imaging sensors consist of one of:
three imaging sensors arranged in a triangular pattern;
four imaging sensors arranged in a square pattern; or
six imaging sensors arranged in a hexagonal pattern.

11. The apparatus of claim 9, wherein two or more of the baseline directions are substantially different from one another.

12. The apparatus of claim 9, wherein, to perform the cross-correlations, the at least one processor is configured to:
shift sliding windows within the feature maps of the non-reference image frames multiple times; and
determine cross-correlations between the at least part of the feature map of the reference image frame and contents of the sliding windows within the feature maps of the non-reference image frames; and wherein the at least one processor is configured to shift the sliding windows in different directions in different ones of the feature maps of the non-reference image frames, the different directions associated with the baseline directions.

13. The apparatus of claim 9, wherein, to generate the confidence maps, the at least one processor is configured, for each set of correlated feature maps, to:
identify maximum values in the set of correlated feature maps;
generate a lower-resolution confidence map based on the identified maximum values; and
upsample the lower-resolution confidence map to produce a higher-resolution confidence map.

14. The apparatus of claim 9, wherein, to generate the depth map, the at least one processor is configured to:
scale disparity values contained in the disparity maps or depth values that are based on the disparity values contained in the disparity maps with confidence levels contained in the confidence maps; and
combine the scaled disparity or depth values to produce final depth values for the depth map.

15. The apparatus of claim 9, wherein at least two of the baseline directions are not orthogonal to one another.

16. A non-transitory computer readable medium containing instructions that when executed cause at least one processor to:
obtain at least three input image frames of a scene captured using at least three imaging sensors, the input image frames comprising a reference image frame and multiple non-reference image frames;
generate multiple disparity maps using the input image frames, wherein each disparity map is associated with the reference image frame and different ones of the disparity maps are associated with different ones of the non-reference image frames;
generate multiple confidence maps using the input image frames, wherein each confidence map identifies weights associated with one of the disparity maps; and
generate a depth map of the scene using the disparity maps and the confidence maps;

wherein the input image frames are associated with different baseline directions, each baseline direction extending between the imaging sensor used to capture the reference image frame and one of the imaging sensors used to capture one of the non-reference image frames;

wherein the instructions that when executed cause the at least one processor to generate the disparity maps comprise instructions that when executed cause the at least one processor to:
  generate multiple feature maps each identifying features of a different one of the input image frames;
  perform multiple cross-correlations, each occurring between (i) at least part of the feature map of the reference image frame and (ii) a different one of the feature maps of the non-reference image frames, to produce different sets of correlated feature maps; and
  generate the disparity maps using the sets of correlated feature maps; and
wherein the instructions that when executed cause the at least one processor to generate the confidence maps comprise instructions that when executed cause the at least one processor, for each set of correlated feature maps, to:
  identify maximum values in the set of correlated feature maps;
  generate a lower-resolution confidence map based on the identified maximum values; and
  upsample the lower-resolution confidence map to produce a higher-resolution confidence map.

17. The non-transitory computer readable medium of claim 16, wherein the imaging sensors consist of one of:
  three imaging sensors arranged in a triangular pattern;
  four imaging sensors arranged in a square pattern; or
  six imaging sensors arranged in a hexagonal pattern.

18. The non-transitory computer readable medium of claim 16, wherein the instructions when executed cause the at least one processor to:
  process each of the input image frames using first convolutional layers to generate one of the feature maps; and
  process each set of correlated feature maps using deconvolutional or upsampling layers and second convolutional layers to generate one of the disparity maps.

19. The non-transitory computer readable medium of claim 16, wherein the instructions that when executed cause the at least one processor to perform the cross-correlations comprise:
  instructions that when executed cause the at least one processor to:
    shift sliding windows within the feature maps of the non-reference image frames multiple times; and
    determine cross-correlations between the at least part of the feature map of the reference image frame and contents of the sliding windows within the feature maps of the non-reference image frames; and
  wherein the instructions when executed cause the at least one processor to shift the sliding windows in different directions in different ones of the feature maps of the non-reference image frames, the different directions associated with the baseline directions.

20. The non-transitory computer readable medium of claim 16, wherein two or more of the baseline directions are substantially different from one another.

21. The non-transitory computer readable medium of claim 16, wherein the instructions that when executed cause the at least one processor to generate the depth map comprise:
  instructions that when executed cause the at least one processor to:
    scale disparity values contained in the disparity maps or depth values that are based on the disparity values contained in the disparity maps with confidence levels contained in the confidence maps; and
    combine the scaled disparity or depth values to produce final depth values for the depth map.

* * * * *